United States Patent
Kadowaki et al.

(10) Patent No.: US 7,096,149 B2
(45) Date of Patent: Aug. 22, 2006

(54) METHOD FOR DETERMINING COORDINATE SYSTEM FOR DEVICE UNDER MEASUREMENT, AND COORDINATE MEASURING APPARATUS

(75) Inventors: Soichi Kadowaki, Kawasaki (JP); Fumihiro Takemura, Kawasaki (JP); Naoji Horiuchi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 5 days.

(21) Appl. No.: 11/037,537

(22) Filed: Jan. 18, 2005

(65) Prior Publication Data

US 2005/0155242 A1 Jul. 21, 2005

(30) Foreign Application Priority Data

Jan. 19, 2004 (JP) ............................. 2004-010838

(51) Int. Cl.
G01C 9/00 (2006.01)
G01C 17/00 (2006.01)
(52) U.S. Cl. ....................................................... 702/152
(58) Field of Classification Search ................. 702/152
See application file for complete search history.

(56) References Cited

U.S. PATENT DOCUMENTS

| 4,825,394 A | | 4/1989 | Beamish et al. | |
|---|---|---|---|---|
| 4,901,253 A | * | 2/1990 | Iwano et al. ................. | 345/419 |
| 4,962,591 A | | 10/1990 | Zeller et al. | |
| 2004/0107073 A1 | * | 6/2004 | Sakurada et al. ............ | 702/167 |
| 2005/0031191 A1 | * | 2/2005 | Vankatachalam ........... | 382/152 |
| 2005/0086025 A1 | * | 4/2005 | Nomura et al. .............. | 702/167 |

FOREIGN PATENT DOCUMENTS

EP 1225423 A1 7/2002

OTHER PUBLICATIONS

Japanese Patent Abstract, Publication No. 07270152, Published Oct. 20, 1995.
European Search Report, for EP Application No. 05000919, three pages.
Japanese Patent Abstract, Publication No. 2000-339478, Published Dec. 8, 2000.
Japanese Patent Abstract, Publication No. 07-128044, Published May 19, 1995.
Japanese Patent Abstract, Publication No. 07-270152, Published Oct. 20, 1995.
Japanese Patent Abstract, Publication No. 2004-108883, Published Apr. 8, 2004.
Japanese Patent Abstract, Publication No. 2004-191365, Published Jul. 8, 2004.

* cited by examiner

*Primary Examiner*—Bryan Bui
*Assistant Examiner*—Demetrius Pretlow (57) ABSTRACT

Method for determining a coordinate system including a preliminary measurement step in which a detector of a coordinate measuring apparatus is used to scan first measurement areas of the device to obtain position coordinate information and the detector is used to scan a second measurement area that is not on a straight line connecting the first measurement areas to obtain position coordinate information; a feature-point detection step of obtaining the position of a feature point in each of the measurement areas according to a result of measurement; a reference-line determination step of obtaining a first reference line according to the position of each feature point in the first measurement areas, and obtaining a second reference line perpendicular to the first reference line and passing through a feature point located in the second measurement area; an origin-setting step; and an axis setting step.

4 Claims, 8 Drawing Sheets

METHOD FOR DETERMINING COORDINATE SYSTEM FOR DEVICE UNDER MEASUREMENT, AND COORDINATE MEASURING APPARATUS

RELATED APPLICATIONS

This application claims priority to the Japanese Patent Application 2004-10838 dated on Jan. 19, 2004 and is hereby incorporated with reference for all purposes.

BACKGROUND OF THE INVENTION

1. Field of the Invention

The present invention relates to methods for determining a coordinate system for a device under measurement and to coordinate measuring apparatuses. More particularly, the present invention relates to a method for setting a coordinate system for a device under measurement both easily and accurately.

2. Prior Art

Conventionally, coordinate measuring apparatuses, such as surface-characteristic measuring apparatuses have been used for measuring surface characteristics of a device under measurement, such as surface roughness and surface shapes.

Coordinate measuring apparatuses can automatically move along each of their axes and perform measurement under computer numerical control with the use of part programs that specify measurement procedures, including measurement areas and movement instructions for the apparatuses.

Instructions in the part programs are described either in a machine coordinate system determined by a unique origin of the coordinate measuring apparatus or in a coordinate system for the device under measurement, determined by the origin of the device under measurement.

An instruction for setting a coordinate system for a device under measurement is frequently used in a part program because it allows a coordinate measuring apparatus that uses the part program to perform automatic measurement with the coordinate system for the device under measurement being changed.

Conventionally, to set a coordinate system for a device under measurement, a convenient measurement unit is frequently used instead of a detector of the coordinate measuring apparatus. In that case, the shape of almost the entire device under measurement, including the external shape and the internal shape of the device under measurement, is measured first, and then, a coordinate system for the device under measurement is set.

In a conventional case, for example, the external shape of almost the entire device under measurement is measured, and then the origin of a coordinate system for the device under measurement is specified (this case is disclosed, for example, in Japanese Patent Applications No. 2002-270307 and No. 2002-340930).

In another conventional case, the shapes of almost the whole of the internal parts of a plurality of holes provided for a device under measurement are measured, and then a coordinate system for the device under measurement is specified (this case is disclosed, for example, in Japanese Unexamined Patent Application Publications No. Hei-7-270152 and No. Hei-7-128044).

The shape information of a device under measurement can be obtained by applying image processing to the result of shape measurement (this case is disclosed, for example, in Japanese Unexamined Patent Application Publication No. 2000-339478).

Since a coordinate system is individually set for each device under measurement in a part program, the setting operation must be performed many times. Therefore, there are demands for an apparatus that can easily set the coordinate system for a device under measurement, and it is also preferred that the setting be performed as accurately as possible.

However, there is conventionally no suitable technology which allows a coordinate system for a device under measurement to be set both easily and accurately.

Conventionally, if the number of measurement points used for obtaining the shape information of a device under measurement is reduced in order to more easily set a coordinate system for the device under measurement, the coordinate system for the device under measurement cannot be accurately set in some cases. Therefore, the shape of almost the entire device under measurement is usually measured.

Conversely, if the number of measurement points is increased in order to more accurately set a coordinate system for a device under measurement, the measurement requires more time, which is troublesome. When the setting is performed many times, this issue becomes more problematic.

SUMMARY OF THE INVENTION

In view of the foregoing issues of the conventional technologies, it is an object of the present invention to provide a method for setting a coordinate system for a device under measurement both easily and accurately, and a coordinate measuring apparatus for setting a coordinate system for a device under measurement both easily and accurately.

For achieving the above-mentioned object, the method in accordance with the present invention is a method for setting a coordinate system for a device under measurement, in which the direction and position of the coordinate system are determined for the device under measurement according to the position of a feature point obtained by measuring a feature portion of the device under measurement, the relationships of axes in the coordinate system selected in advance being known. The method comprises: a preliminary measurement step; a feature-point detection step; a reference-line determination step; an origin-setting step; and an axis setting step.

Here, in the preliminary measurement step, a detector of a coordinate measuring apparatus is used to scan first measurement areas which include two or more feature portions of the device under measurement to obtain position coordinate information. And in the preliminary measurement step, the detector of the coordinate measuring apparatus is used to scan a second measurement area which includes one or more feature portions that are not on a straight line connecting the first measurement areas to obtain position coordinate information.

In the feature-point detection step, the position of a feature point in each of the measurement areas according to a result of measurement obtained in the preliminary measurement step, are obtained.

In the reference-line determination step, a first reference line according to the position of each feature point in the first measurement areas obtained in the feature-point detection step, is obtained. And in the reference-line determination step, a second reference line perpendicular to the first reference line and passing through a feature point located in the second measurement area, obtained in the feature-point detection step, is obtained.

In the origin-setting step, the origin of the coordinate system for the device under measurement according to the position of the intersection of the first reference line and the second reference line obtained in the reference-line determination step, is positioned.

In the axis setting step, the directions of axes of the coordinate system for the device under measurement according to the directions of the reference lines obtained in the reference-line determination step, are determined.

In the present invention, feature portions of a device under measurement include a portion close to an edge point of the device under measurement, a step section such as a recess or a protrusion, a circumferential wall section of a cylinder or a tube, and others.

In the present invention, feature points include an edge point of the device under measurement, the bottom of a recess, the peak of a protrusion, a peak along a detection axis of a detector, and others.

In the present invention, relationships among axes include the type of coordinate system, such as an orthogonal coordinate system or a cylindrical coordinate system, the selection of axes, such as the X, Y, and Z axes or the X and Y axes, the angle formed by axes, and others.

In the present invention, coordinate systems include an orthogonal coordinate system, a cylindrical coordinate system, and others.

In the present invention, coordinate measuring apparatuses include surface-characteristic measuring apparatuses and others. The surface-characteristic measuring apparatuses include a surface-roughness measuring apparatus for measuring surface roughness, a surface-shape measuring apparatus for measuring a surface shape, a roundness measuring apparatus, and others.

The present invention includes a case in which a coordinate system for a device under measurement is specified at a feature point, and a case in which a coordinate system for a device under measurement is specified at another point according to designed dimensions of the device under measurement or the position coordinates of a feature point.

<Quadrangular Cross-Section>

Preferably, in the present invention, when the device under measurement is substantially a quadrangular prism, or the device under measurement includes a substantially quadrangular-prism-shaped portion, and when the direction and position of the coordinate system are determined for the device under measurement, in the preliminary measurement step, the first measurement areas are scanned to traverse one side of the device under measurement at a certain spatial interval. And in the preliminary measurement step, the second measurement area is scanned to traverse another side adjacent to the one side.

In the feature-point detection step, the position of an edge point is obtained at each of the measurement areas according to a result of measurement obtained in the preliminary measurement step.

In the reference-line determination step, the first reference line is obtained according to the position of each edge point in the first measurement areas, obtained in the feature-point detection step. And in the reference-line determination step, the second reference line perpendicular to the first reference line and passing through an edge point located in the second measurement area, obtained in the feature-point detection step, is obtained.

In the origin-setting step, the position of the intersection of the first reference line and the second reference line obtained in the reference-line determination step is set as the origin of the coordinate system for the device under measurement.

In the axis setting step, the reference lines obtained in the reference-line determination step are set as axes of the coordinate system for the device under measurement.

<Circular Cross-Section>

Preferably, in the present invention, when the device under measurement is substantially a cylinder, or the device under measurement includes a substantially cylinder-shaped portion, and when the direction and position of the coordinate system are determined for the device under measurement, in the preliminary measurement step, the first measurement areas are scanned on a circumferential wall section of the device under measurement at a certain spatial interval along an axis direction. And in the preliminary measurement step, the second measurement area is scanned to traverse a circumferential edge section of the device under measurement.

In the feature-point detection step, the position of each peak along a detection axis in the first measurement areas is obtained. And in the feature-point detection step, the position of an edge point in the second measurement area is obtained.

In the reference-line determination step, the first reference line is obtained according to the position of each edge point in the first measurement areas, obtained in the feature-point detection step. And in the reference-line determination step, the second reference line perpendicular to the first reference line and passing through an edge point located in the second measurement area, obtained in the feature-point detection step, is obtained.

In the origin-setting step, the position of the circumferential edge section of the device under measurement is obtained according to the position of the intersection of the first reference line and the second reference line obtained in the reference-line determination step. And in the origin-setting step, the origin of the coordinate system for the device under measurement is positioned according to the position of the circumferential edge section.

In the axis setting step, the directions of axes of the coordinate system for the device under measurement are determined according to the directions of the reference lines obtained in the reference-line determination step.

<Coordinate Measuring Apparatus>

For achieving the above-mentioned object, the coordinate measuring apparatus in accordance with the present invention is a coordinate measuring apparatus for moving an axis and for performing measurement according to a part program, the coordinate measuring apparatus comprises an unit for determining the coordinate system for the device under measurement comprising. The unit for determining the coordinate system for the device under measurement comprises: a preliminary measurement unit; a feature-point detector; a reference-line determination unit; an origin-setting unit; and an axis setting unit. In the unit for determining the coordinate system for the device under measurement, the direction and position of the coordinate system are determined for the device under measurement according to the position of a feature point obtained by measuring a feature portion of the device under measurement, the relationships of axes in the coordinate system selected in advance being known.

Here, the preliminary measurement unit scans first measurement areas which include two or more feature portions of the device under measurement with the use of a detector of the coordinate measuring apparatus to obtain position coordinate information. And the preliminary measurement unit scans a second measurement area which includes one or more feature portions that are not on a straight line connecting the first measurement areas, with the use of the detector of the coordinate measuring apparatus, to obtain position coordinate information.

The feature-point detector obtains the position of a feature point in each of the measurement areas according to a result of measurement obtained by the preliminary measurement unit.

The reference-line determination unit obtains a first reference line according to the position of each feature point in the first measurement areas, obtained by the feature-point detector. And the reference-line determination unit obtains a second reference line perpendicular to the first reference line and passing through a feature point located in the second measurement area, obtained by the feature-point detector.

The origin-setting unit positions the origin of the coordinate system for the device under measurement according to the position of the intersection of the first reference line and the second reference line obtained by the reference-line determination unit.

The axis setting unit determines the directions of axes of the coordinate system for the device under measurement according to the directions of the reference lines obtained by the reference-line determination unit.

DESCRIPTION OF THE PREFERRED EMBODIMENT

Embodiments of the present invention will be described below by referring to the drawings.

Figure 1A:
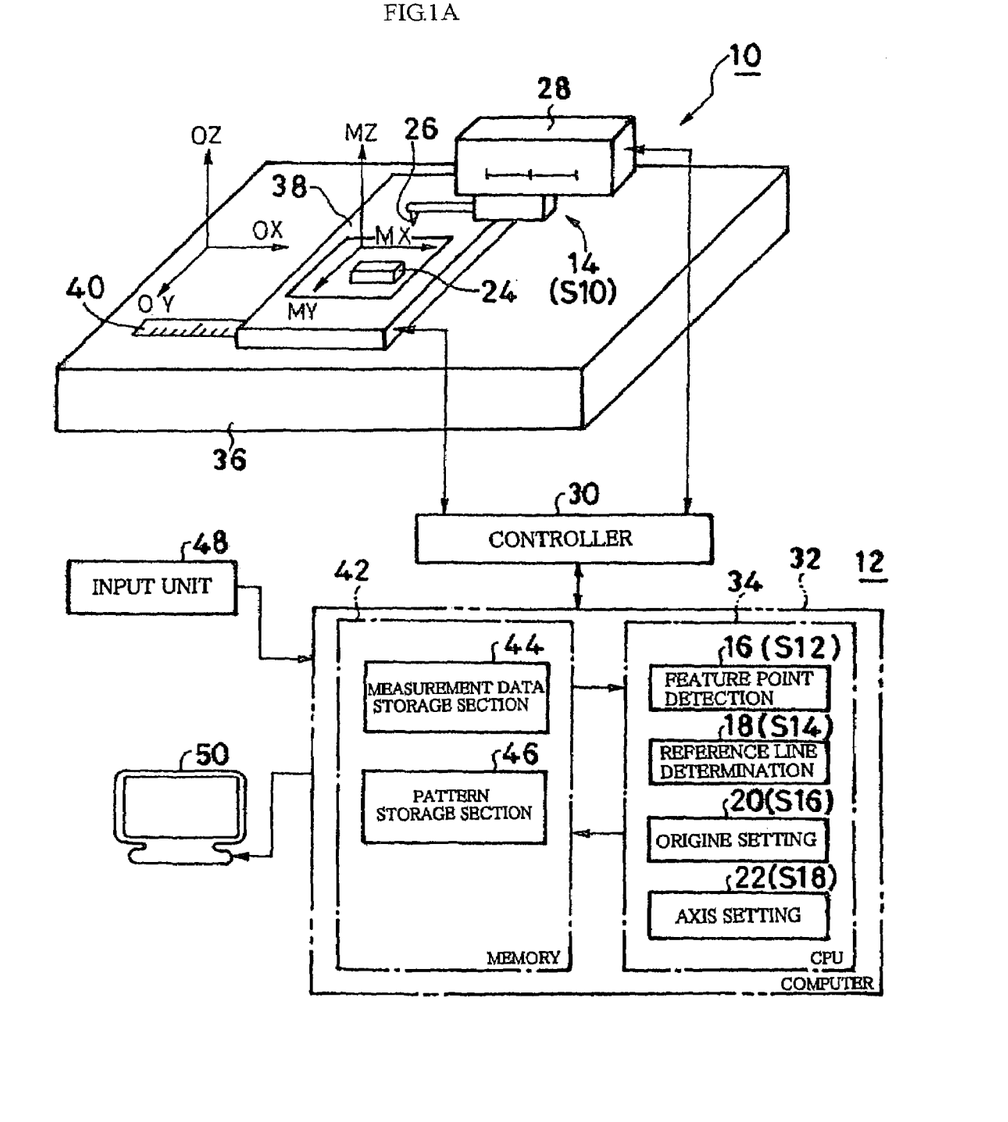
FIGS. 1A and 1B show an outline structure of a coordinate measuring apparatus for performing a method for determining a coordinate system for a device under measurement according to an embodiment of the present invention.
Figure 1B:
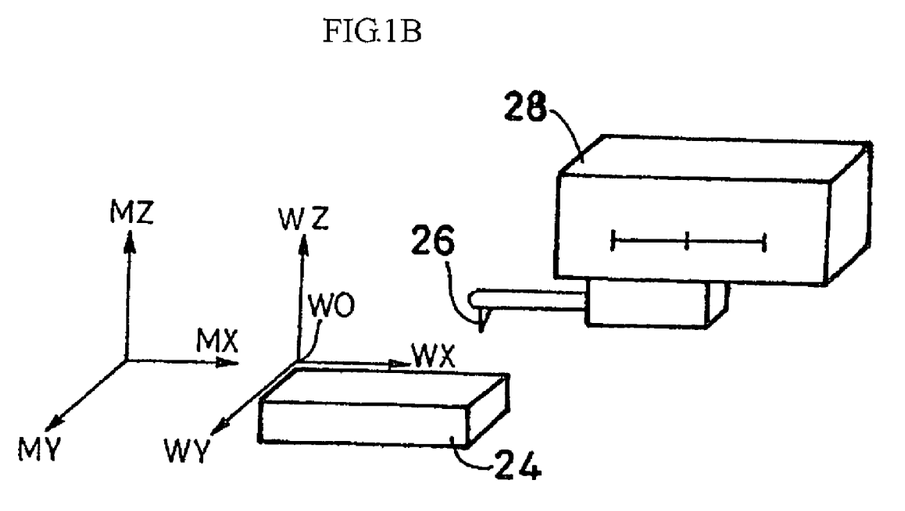

FIG. 1A shows an outline structure of a coordinate measuring apparatus for performing a method for determining a coordinate system for a device under measurement (a method for determining a workpiece coordinate system) according to an embodiment of the present invention. FIG. 1B shows an example case in which a coordinate system is specified for a device under measurement.

A surface-characteristic measuring apparatus (coordinate measuring apparatus) 10 shown in FIG. 1A moves along its axes and performs measurement according to a part program. The surface-characteristic measuring apparatus 10 includes a mechanism for determining a coordinate system for a device under measurement (a unit for determining a workpiece coordinate system) 12. The mechanism 12 uses a method for determining a coordinate system for a device under measurement (a workpiece coordinate system) according to the present invention.

The mechanism 12 includes preliminary measurement unit 14, feature-point detection unit 16, reference-line determination unit 18, origin setting unit 20, and axis setting unit 22. The mechanism 12 determines for a device under measurement (an object to be measured, a workpiece) 24 the directions and positions of a coordinate system in which the relationships among axes selected in advance are known, according to feature points obtained by measuring feature portions of the device under measurement 24.

The preliminary measurement unit 14 includes, for example, a contact needle 26, a detector 28, and a controller 30, of the surface-characteristic measuring apparatus 10, and performs a preliminary measurement step (S10).

In the preliminary measurement step (S10), two feature portions or more are selected as first measurement areas in the device under measurement 24, and the detector 28 performs scanning to obtain positional coordinate information thereof. Then, one or more feature portions that are not on the straight line connecting the first measurement areas are selected as a second measurement area(s) in the device under measurement 24, and the detector 28 performs scanning to obtain positional coordinate information thereof. The detector 28 sequentially outputs measurement data (sequence of points) to a computer 32 through the controller 30.

It is assumed in the present embodiment that the X axis (MX) and the Y axis (MY) of a machine coordinate system are the driving axes of the detector 28, and the Z axis (MZ) of the machine coordinate system is the detection axis of the detector 28.

The feature-point detection unit 16 is formed, for example, of a CPU 34 and other components of the computer 32, and performs a feature-point detection step (S12).

In the feature-point detection step (S12), the position of a feature point is detected at each measurement area according to the result (scanning trace) of measurement obtained in the preliminary measurement step (S10).

The reference-line determination unit 18 is formed, for example, of the CPU 34 and other components of the computer 32, and performs a reference-line determination step (S14).

In the reference-line determination step (S14), a first reference line is obtained according to the positions of feature points obtained in the first measurement areas in the feature-point detection step (S12), and then a second reference line that intersects with the first reference right at a right angle and passes through a feature point obtained in the second measurement area in the feature-point detection step (S12) is obtained.

The origin setting unit 20 is formed, for example, of the CPU 34 and other components of the computer 32, and performs an origin setting step (S16).

In the origin setting step (S16), the origin (WO) of the coordinate system for the device under measurement is positioned according to the position of the intersection of the first reference line and the second reference line obtained in the reference-line determination step (S14).

The axis setting unit 22 is formed, for example, of the CPU 34 and other components of the computer 32, and performs an axis setting step (S18).

In the axis setting step (S18), the directions of the axes (WX, WY, and WZ axes) of the coordinate system for the device under measurement are determined according to the directions of the reference lines obtained in the reference-line determination step (S14).

In the present embodiment, the surface-characteristic measuring apparatus (coordinate measuring apparatus) 10 includes a surface plate 36, a moving table 38, and a scale 40 for the moving table 38 The surface plate 36 has OX, OY, and OZ axes. The moving table 38 has the MX, MY, and MZ axes. The device 24 under measurement is placed on the moving table 38. The device 24 under measurement can be moved along the MX, MY, and MZ axes on the surface plate 36.

In the present embodiment, the computer 32 includes a memory 42. The memory 42 is provided with a measurement-data storage section 44 and a coordinate-system-pattern storage section 46.

The measurement-data storage section 44 stores the result of measurement obtained in the preliminary measurement step (S10).

The coordinate-system-pattern storage section 46 stores the patterns of a plurality of different coordinate systems for a device under measurement, such as an orthogonal coordinate system and a cylindrical coordinate system.

In the present embodiment, the computer 32 also includes manual-input unit 48 and a display 50.

The manual-input unit 48 is used to specify a measurement area, to select the pattern of a coordinate system for the device under measurement, and to input a part program.

The display 50 displays the part program and others.

A method for determining a coordinate system for a device under measurement, according to the present invention, will be described below more specifically.

First Embodiment

In a first embodiment, a coordinate system (WX, WY, and WZ) is specified for the device 24 under measurement placed on the moving table 38, which moves in the MX, MY, and MZ axes directions.

In the present embodiment, the device 24 under measurement is a quadrangular prism, and the coordinate system for the device 24 under measurement is set in advance to an orthogonal coordinate system.

<Preliminary Measurement>

Figure 2A:
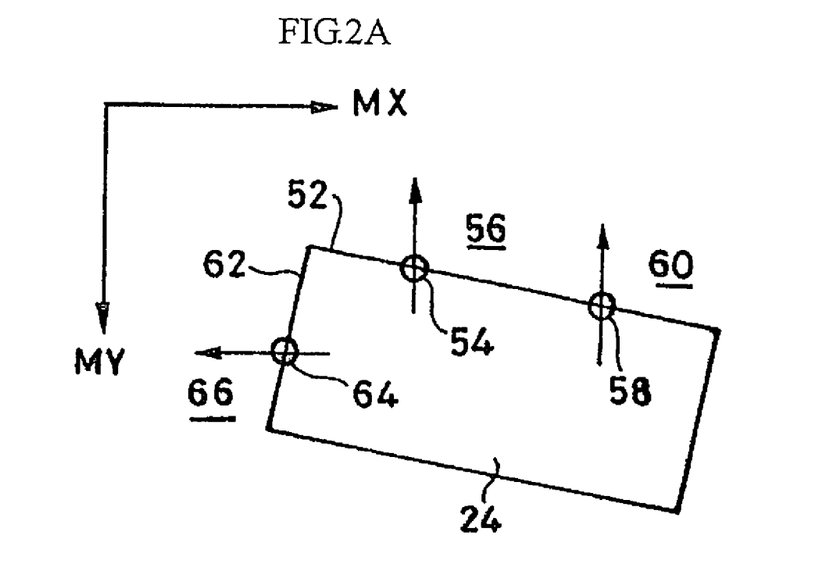
FIGS. 2A and 2B show a method for determining a coordinate system for a device under measurement according to a first embodiment of the present invention.

In the preliminary measurement step (S10), the detector 28 of the surface-characteristic measuring apparatus 10 is used to perform scanning that traverses a long side 52 of the upper surface of the device 24 under measurement, and also to perform scanning that traverses a short side 62 of the upper surface of the device 24 under measurement as shown in FIG. 2A.

Specifically, in the preliminary measurement step (S10), a feature portion 56 that includes a first edge point (feature point) 54 located on the long side 52 on the upper surface of the device 24 under measurement is specified as a first measurement area, and first preliminary measurement is performed. Then, a feature portion 60 that includes a second edge point 58 (feature point) is specified as another first measurement area, and second preliminary measurement is performed.

A feature portion 66 that includes a third edge point (feature point) 64 located on the short side 62 on the upper surface of the device 24 under measurement is specified as a second measurement area, and third preliminary measurement is performed.

In the first preliminary measurement, the detector 28 of the surface-characteristic measuring apparatus 10 is used to scan the first feature portion 56 of a first measurement area in a direction indicated by an arrow in the figure parallel to the Y axis (MY) of the machine coordinate system. More specifically, in the first preliminary measurement, the detector 28 performs scanning from a point slightly closer to the inner side than the first edge point 54 on the device 24 under measurement, toward the outside, to obtain positional coordinate information in the machine coordinate system. In the second preliminary measurement, the detector 28 of the surface-characteristic measuring apparatus 10 is used to scan the second feature portion 60 of another first measurement area in the same way as in the first preliminary measurement to obtain positional coordinate information in the machine coordinate system.

In the third preliminary measurement, the detector 28 of the surface-characteristic measuring apparatus 10 is used to scan the feature portion 66 of the second measurement area in a direction indicated by an arrow in the figure parallel to the X axis (MX) of the machine coordinate system. More specifically, in the third preliminary measurement, the detector 28 performs scanning from a point slightly to the right of the third edge point 64 on the device 24 under measurement, toward the outside, to obtain positional coordinate information in the machine coordinate system.

<Feature-Point Detection>

In the feature-point detection step (S12), with the use of shape analysis and other processing performed by the computer, the positional coordinates of the first edge point 54 in the first feature portion 56 at one of the first measurement areas are obtained in the machine coordinate system according to the positional coordinate information (measurement result) obtained in the first preliminary measurement. In the same way, the positional coordinates of the second edge point 58 in the second feature portion 60 at the other of the first measurement areas are obtained in the machine coordinate system according to the positional coordinate information obtained in the second preliminary measurement. Also in the same way, the positional coordinates of the third edge point 64 in the feature portion 66 at the second measurement area are obtained in the machine coordinate system according to the positional coordinate information obtained in the third preliminary measurement.

<Reference-Line Determination>

Figure 2B:
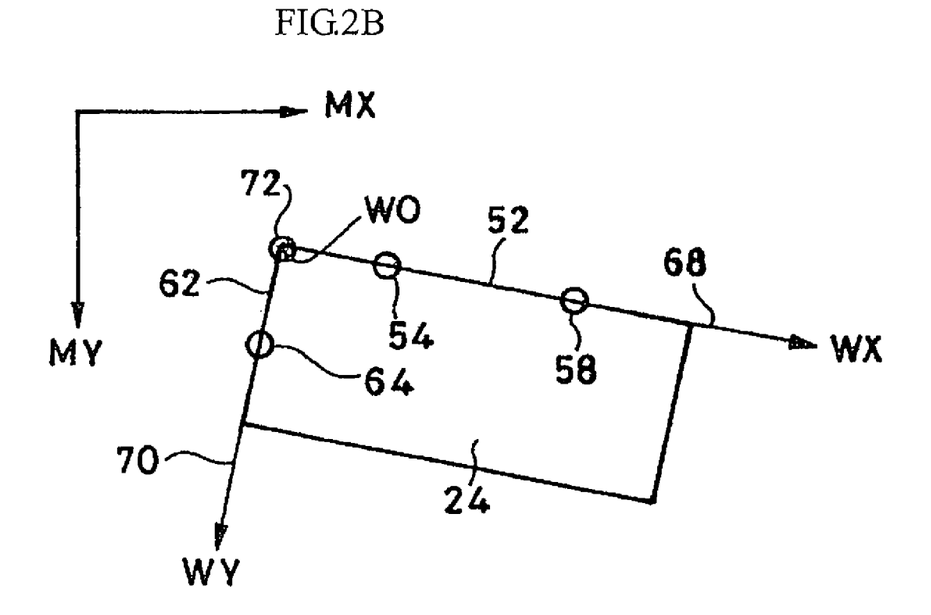

In the reference-line determination step (S14), as shown in FIG. 2B, a straight line passing through the first edge point 54 and the second edge point 58 at the first measurement areas, obtained in the feature-point detection step (S12), is used as a first reference line 68. A straight line perpendicular to the first reference line 68 and passing through the third edge point 64 obtained in the feature-point detection step (S12) is used as a second reference line 70.

<Origin Setting>

In the origin setting step (S16), the positional coordinates of the intersection 72 of the first reference line 68 and the second reference line 70 obtained in the reference-line determination step (S14) are obtained. The position of the intersection 72 is specified as the origin (WO) of the coordinate system for the device 24 under measurement.

<Axis Setting>

In the axis setting step (S18), the first reference line 68 obtained in the reference-line determination step (S14) is specified as the X axis (WX) of the coordinate system for the device 24 under measurement. Also, the second reference line 70 obtained in the reference-line determination step (S14) is specified as the Y axis (WY) of the coordinate system for the device under measurement.

As a result, the present embodiment can determine the directions of the axes and the position of the origin of the coordinate system for the device under measurement more easily and more accurately than the conventional method.

Specifically, in the conventional method, the shape data of almost the entire device under measurement is obtained, and geometrical elements that fit the shape data are obtained. When the conventional method is applied every time a coordinate system for a device under measurement is set, it takes time and labor. In addition, when a separate detector or a separate measurement unit is used instead of a detector of a surface-characteristic measurement apparatus, reproducibility is not obtained in some cases when a part program is executed after a coordinate system for a device under measurement is determined.

In contrast, the detector of the coordinate measuring apparatus itself is used in the present embodiment. In addition, instead of the entire device under measurement only specific portions of the device under measurement are preliminarily measured. Furthermore, in the present embodiment, the directions of the axes and the position of the origin of the coordinate system for the device under measurement for which the type is selected in advance are determined according to the reference lines obtained according to the position of each feature point.

Therefore, a coordinate system for a device under measurement can be accurately determined even with only three measurement portions in the present embodiment. Consequently, the coordinate system for the device under measurement can be specified both easily and accurately. The coordinate system for the device under measurement can be specified in a part program. Therefore, in the present embodiment, both ease and accuracy are obtained even in generating and editing a part program.

Second Embodiment

In the foregoing description, the coordinate system was specified for the device under measurement placed on the moving table, which is moved in the MX, MY, and MZ axes. However, the present invention is not limited to this case.

Figure 3A:
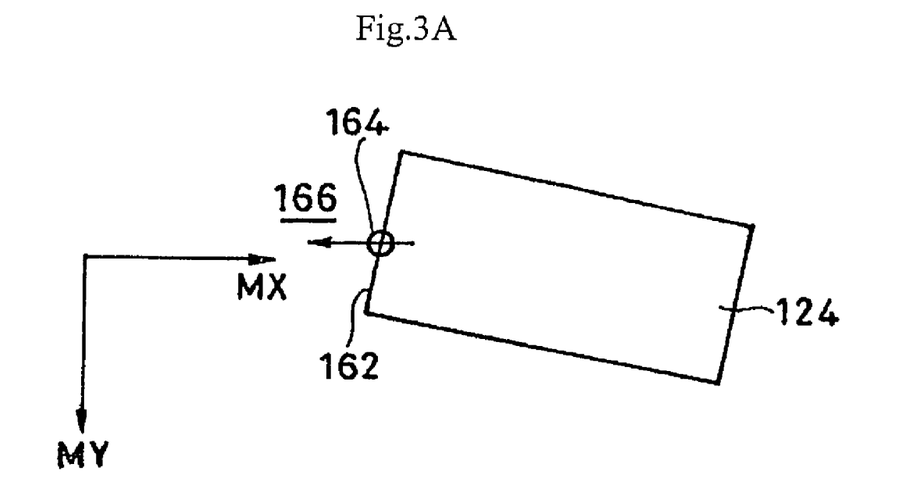
FIGS. 3A and 3B show a method for determining a coordinate system for a device under measurement according to a second embodiment of the present invention.
Figure 3B:
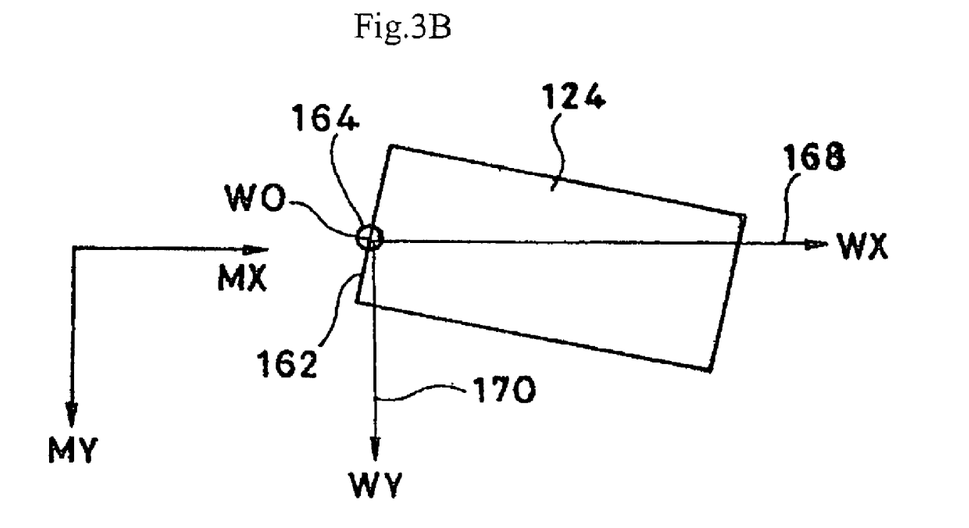

The present invention is suitably applied, for example, to a case in which a coordinate system is specified for a device under measurement placed on a moving table that is moved only in the MX axis, as shown in FIG. 3.

In the present embodiment, it is assumed that the driving axis of a detector is parallel to the X axis (MX) of the machine coordinate system, and that the detection axis of the detector is parallel to the Z axis (MZ) of the machine coordinate system. In the present embodiment, portions corresponding to those described in the first embodiment are assigned the same reference numerals, plus 100, as those shown in the first embodiment and a description thereof is omitted.

<Preliminary Measurement and Feature-Point Detection>

In the present embodiment, as shown in FIG. 3, scanning is performed (in the preliminary measurement step) in a direction indicated by an arrow in the figure parallel to the X axis (MX) of the machine coordinate system at a feature portion 166 in a second measurement area of a device 124 under measurement, and the position of an edge point 164 is detected (in the feature-point detection step).

<Reference-Line Determination>

In the reference-line determination step, a straight line passing through the edge point 164 and parallel to the X axis (MX) of the machine coordinate system is specified as a first reference line 168, and a straight line passing through the edge point 164 and parallel to the Y axis (MY) of the machine coordinate system is specified as a second reference line 170.

<Origin Setting>

In the origin setting step, the edge point 164 is specified as the origin (WO) of the coordinate system for the device under measurement.

<Axis Setting>

In the axis setting step, the first reference line 168 is specified as the X axis (WX) of the coordinate system for the device 124 under measurement, and the second reference line 170 is specified as the Y axis (WY) of the coordinate system for the device 124 under measurement.

As described above, in the present embodiment, the coordinate system can be more easily and accurately determined for the device 124 under measurement placed on the moving table, which is moved only in the MX-axis direction, with just one preliminary measurement, described above.

In the first and second embodiment, the device under measurement is a quadrangular prism. However, the present invention can also be applied to a case in which a coordinate system is specified for a device under measurement that includes a quadrangular-prism-shaped portion with the use of the same method as that for a quadrangular prism, described above.

Third Embodiment

Figure 4A:
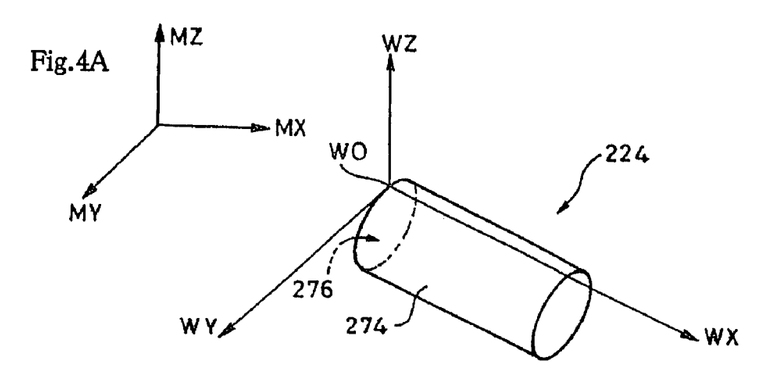
FIGS. 4A, 4B, 4C, 4D and 4E show a method for determining a coordinate system for a device under measurement according to a third embodiment of the present invention.

In the present embodiment, a device 224 under measurement is a cylinder, as shown in FIG. 4A, and an orthogonal coordinate system is specified at a circumferential edge section of the cylinder, which is disposed horizontally.

It is assumed in the present embodiment that a detector is moved along the MX and MY axes of the machine coordinate system, and the detection axis of the detector is along the MZ axis. Portions corresponding to those described in the first embodiment are assigned the same reference numerals as those used in the first embodiment plus 200, and a description thereof is omitted.

<Preliminary Measurement>

In a preliminary measurement step, scanning is performed along the MX axis at a certain spatial interval in the direction perpendicular to the axis, on a circumferential wall section 274 of the device 224 under measurement for first measurement areas. Scanning is also performed so as to traverse the boundary of the circumferential wall section 274 and a left end face 276 of the device 224 under measurement for a second measurement area.

Figures 4B, 4C, 4D, 4E:
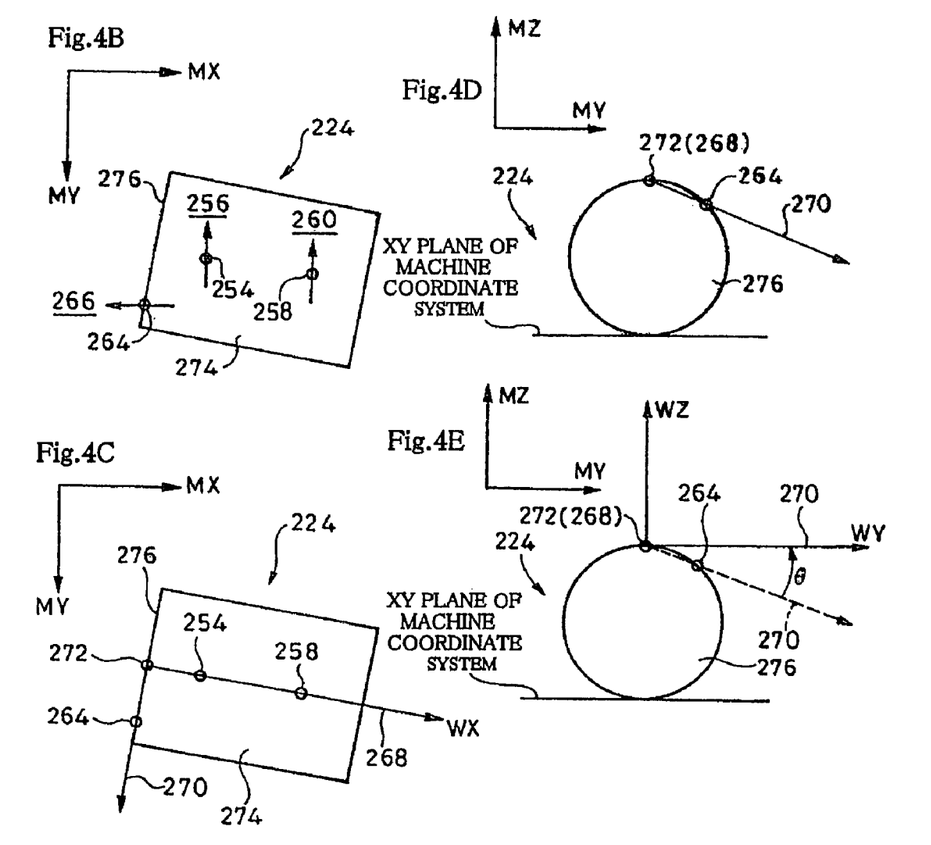

More specifically, in the preliminary measurement step, as shown in FIG. 4B, the first measurement areas include a first feature portion 256 and a second feature portion 260 at positions separated along the center axis of the device 224 under measurement on the circumferential wall section 274. The second measurement area includes a third feature portion 266 positioned on a circumferential edge section of the device 224 under measurement.

The feature portions 256 and 260 in the first measurement areas are scanned in a direction indicated by arrows in FIG. 4B along the MY axis, and the feature portion 266 in the second measurement area is scanned in a direction indicated by an arrow in FIG. 4B along the MX axis.

<Feature-Point Detection>

In a feature-point detection step, the positions of peaks 254 and 258 in the first measurement areas are obtained in the machine coordinate system, and the position of an edge point 264 in the second measurement area is also obtained in the machine coordinate system.

More specifically, the position coordinates of a first peak 254 located at the outermost position along the MZ axis on the circumferential wall section 274 of the device 224 under measurement and the position coordinates of a second peak 258 are obtained. In addition, the position coordinates of the edge point 264 located on a circumferential edge section of the cylinder are also obtained.

<Reference-Line Determination>

In a reference-line determination step, as shown in FIG. 4C, a first reference line 268 is obtained according to the peaks 254 and 258 located in the first measurement areas, obtained in the feature-point detection step. The first reference line 268 passes through the first peak 254 and the second peak 258. A second reference line 270 perpendicular to the first reference line 268 and passing through the edge point 264 located in the second measurement area, obtained in the feature-point detection step, is also obtained.

<Origin Setting>

In an origin setting step, a position on a circumferential edge section of the device 224 under measurement is obtained according to the intersection of the first reference line and the second reference line obtained in the reference-line determination step. According to the position of the circumferential edge section of the device 224 under measurement, the origin of a coordinate system for the device 224 under measurement is positioned.

Specifically, the intersection 272 of the first reference line 268 and the second reference line 270 is obtained, and the intersection 272 is set to the origin (WO) of the coordinate system for the device 224 under measurement.

<Axis Setting>

In an axis-setting step, the directions of the axes of the coordinate system for the device 224 under measurement are determined according to the directions of the reference lines determined in the reference-line determination step.

In the axis-setting step, the first reference line 268 is set to the X axis (WX) of the coordinate system for the device 224 under measurement.

The second reference line 270 is at an angle with respect to the XY plane of the machine coordinate system, as shown in FIG. 4D.

Therefore, in the axis-setting step, the second reference line 270 is rotated by an angle θ about the first reference line 268 so as to make the second reference line 270 parallel to the XY plane of the machine coordinate system, as shown in FIG. 4E. Then, the second reference line 270 is set to the Y axis of the coordinate system for the device 224 under measurement.

The second reference line 270 obtained before the rotation may be set to the Y axis of the coordinate system for the device 224 under measurement.

As described above, in the present embodiment, a detector of a coordinate measuring apparatus is used to obtain the position coordinates of two or more feature points located in measurement areas, and the position coordinates of at least one feature point that is not on a straight line connecting the measurement areas, in the same way as in the first and second embodiments. First and second reference lines are obtained according to the position coordinates of the feature points, and the position of the origin of a coordinate system for the device under measurement and the directions of the axes thereof are determined according to the reference lines. Therefore, in the present embodiment, a coordinate system for a cylinder placed horizontally can be easily and accurately specified.

Fourth Embodiment

Figure 5A:
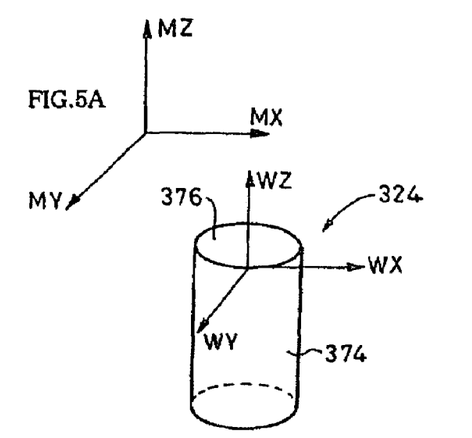
FIGS. 5A, 5B, 5C, 5D and 5E show a method for determining a coordinate system for a device under measurement according to a fourth embodiment of the present invention.

In the present embodiment, a device 324 under measurement is a cylinder disposed upright, as shown in FIG. 5A, and a coordinate system for the device 324 under measurement is specified at a circumferential edge section of an upper end face of the cylinder.

Portions corresponding to those described in the first embodiment are assigned the same reference numerals, plus 300, as those used in the first embodiment (portions corresponding to those described in the third embodiment are assigned the same reference numerals, plus 100, as those used in the third embodiment), and a description thereof is omitted.

<Preliminary Measurement>

Figure 5B:
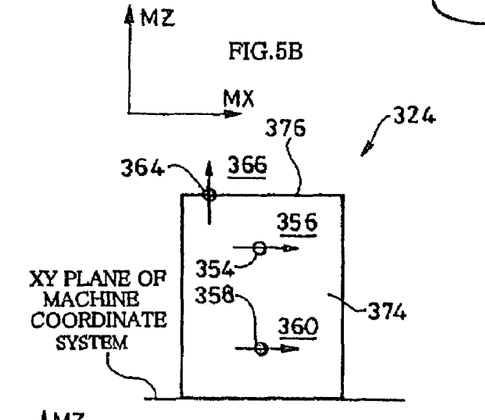

As shown in FIG. 5B, first measurement areas include a first feature portion 356 and a second feature portion 360 at positions separated along the center axis of the device 324 under measurement on a circumferential wall section 374 of the device 324 under measurement. In a preliminary measurement step, the first feature portion 356 and the second feature portion 360 are scanned in a direction indicated by arrows in FIG. 5B along the X axis (MX) of the machine coordinate system.

A second measurement area includes a third feature portion 366 which includes a third edge point 364 on the upper end face 376 of the device 324 under measurement. The third feature portion 366 is scanned in a direction indicated by an arrow in FIG. 5B along the Z axis (MZ) of the machine coordinate system.

<Feature-Point Detection>

In a feature-point detection step, a point that has the largest value along the MY axis on the circumferential wall section 374 of the device 324 under measurement is obtained. The position of a first peak 354 located at the outermost position along the Y axis (MY) of the machine coordinate system and the position of a second peak 358 are obtained. The position of a third edge point 364 located on a circumferential edge section of the device 324 under measurement is also obtained.

In the fourth embodiment, the detector 28 can detect a change along the MY axis.

<Reference-Line Determination>

Figure 5C:
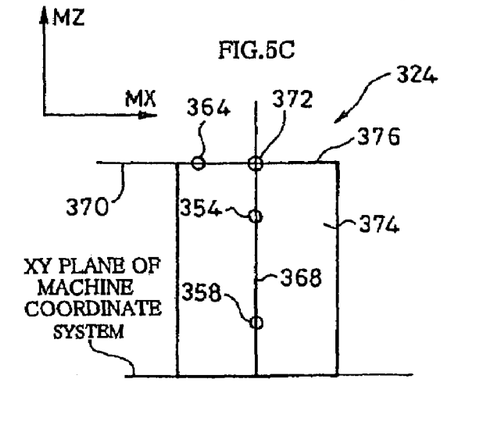

In a reference-line determination step, as shown in FIG. 5C, a straight line passing through the first peak 354 and the second peak 358 is used as a first reference line 368. A second reference line 370 perpendicular to the first reference line 368 and passing through the third edge point 364 is also obtained.

<Origin Setting>

In an origin setting step, the intersection 372 of the first reference line 368 and the second reference line 370 is obtained, and the intersection 372 is set to the origin of a coordinate system for the device 224 under measurement.

<Axis Setting>

In an axis-setting step, the first reference line 368 is set to the Z axis (WZ) of the coordinate system for the device 224 under measurement.

Figure 5D:
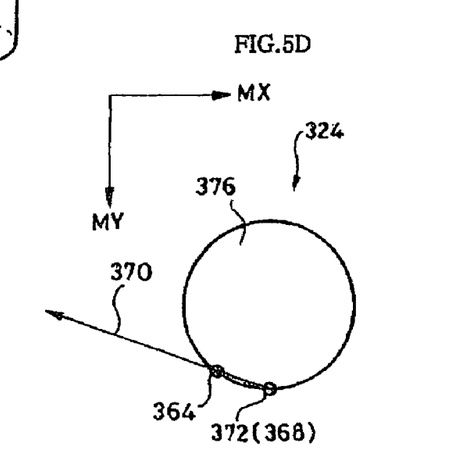

The second reference line 370 is at an angle with respect to the axis (MX) of the machine coordinate system, as shown in FIG. 5D.

Figure 5E:
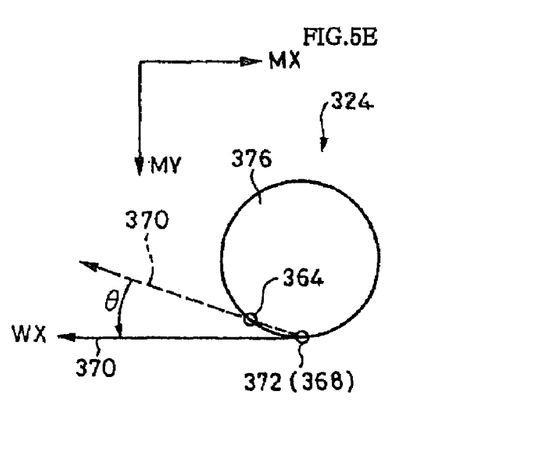

Therefore, in the axis-setting step, the second reference line 370 is rotated by an angle θ about the first reference line 368 so as to make the second reference line 370 parallel to the X axis (MX) of the machine coordinate system, as shown in FIG. 5E. Then, the second reference line 370 is set to the X axis (WX) of the coordinate system for the device 224 under measurement.

The second reference line 370 obtained before the rotation may be set to the X axis of the coordinate system for the device 224 under measurement.

As described above, in the present embodiment, the detector of the coordinate measuring apparatus is used to obtain the position coordinates of two or more feature points located in measurement areas and the position coordinates of at least one feature point that is not on a straight line connecting the measurement areas, in the same way as in the first to third embodiments. First and second reference lines are obtained according to the position coordinates of the feature points, and the position of the origin of a coordinate system for the device under measurement and the directions of the axes thereof are determined according to the reference lines. Therefore, in the present embodiment, a coordinate system for a cylinder disposed upright can be easily and accurately specified.

<Modifications>

In the third and fourth embodiments, the devices under measurement are cylinders. In the present invention, it is also preferred that the same method as that used for the cylinders be applied to a device under measurement that has a cylinder-shaped portion to set a coordinate system for the device under measurement at the cylinder-shaped portion.

In the present invention, it is further preferred that the same method as that used for the cylinders be applied to a device under measurement that has a tube or tube-shaped portion to set a coordinate system for the device under measurement at the tube-shaped portion.

In each of the above-described embodiments, the origin is set on a circumferential edge section of a device under measurement. In the present invention, it is preferred that the origin of a coordinate system for a device under measurement be set on the center of an end face of a cylinder or on the center axis of a tube according to the designed dimensions of a device under measurement, such as the radius and the height, the positions of feature points, and others.

Fifth Embodiment

Devices under measurement are not limited to quadrangular prisms or cylinders, but can be triangular prisms.

Figure 6A:
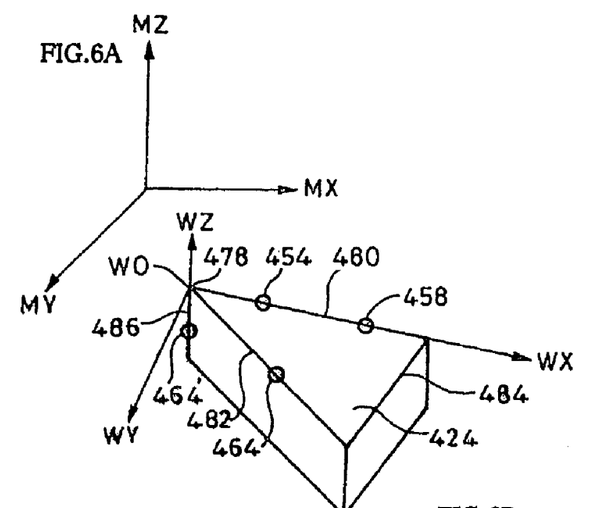
FIGS. 6A, 6B, 6C, 6D and 6E show a method for determining a coordinate system for a device under measurement according to a fifth embodiment of the present invention.

In the present embodiment, a coordinate system for a device under measurement is set at an apex of an upper end face, that is, a triangle, of a triangular prism, as shown in FIG. 6A.

Portions corresponding to those described in the first embodiment are assigned the same reference numerals, plus 400, as those used in the first embodiment, and a description thereof is omitted.

<Coordinate System and Measurement Areas>

In the present embodiment, an orthogonal coordinate system is selected as a coordinate-system pattern for a device under measurement.

As first measurement areas, a first feature portion 456 and a second feature portion 460 are specified on a side 480 of the upper triangular face. As a second measurement area, a third feature portion 466 is specified on another side 482 of the upper triangular face.

<Preliminary Measurement>

Figure 6B:
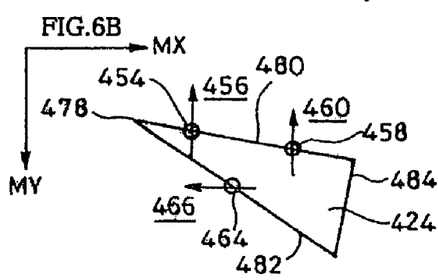

In a preliminary measurement step, as shown in FIG. 6B, the first feature portion 456 and the second feature portion 460 in the first measurement areas are scanned in a direction indicated by arrows in FIG. 6B along the Y axis (MY) of the machine coordinate system. The third feature portion 466 is scanned in a direction indicated by an arrow in FIG. 6B along the X axis (MX) of the machine coordinate system.

<Feature-Point Detection>

In a feature-point detection step, the position coordinates of a first edge point 454 located at the side 480 of the upper triangular face, and the position coordinates of a second edge point 458 are obtained. In addition, the position coordinates of a third edge point 464 located on the side 482 of the upper triangular face are also obtained.

<Reference-Line Determination>

Figure 6C:
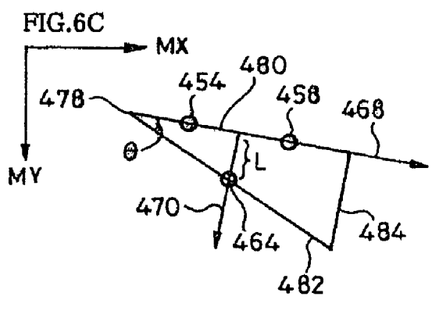

In a reference-line determination step, as shown in FIG. 6C, a straight line passing through the first edge point 454 and the second edge point 458 is used as a first reference line 468. A second reference line 470 perpendicular to the first reference line 468 and passing through the third edge point 464 is also obtained.

<Origin Setting>

In the present embodiment, when the position coordinates of the third edge point 464 are obtained, the distance L between the first reference line 468 and the third edge point 464 is determined.

When the ratios of the lengths of the sides 480, 482, and 484 of the upper triangular face are known in advance, the angle formed by the side 480 and the side 482 of the upper triangular face can be obtained according, for example, to the distance L between the first reference line 468 and the third edge point 464, the ratios of the lengths of the sides, and others. Therefore, in the present embodiment, the position coordinates of an apex 478 of the upper triangular face can be obtained.

In an origin setting step, the apex 478 of the upper triangular face is set to the origin (WO) of the coordinate system for the device 424 under measurement.

<Axis Setting>

Figure 6D:
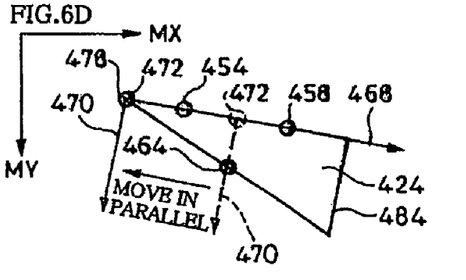

In an axis setting step, the first reference line 468 is set to the X axis (WX) of the coordinate system for the device 424 under measurement.

As shown in FIG. 6D, the second reference line 470 is moved in parallel along the first reference line 468 until the intersection 472 of the first reference line 468 and the second reference line 470 matches an apex 478 of the upper triangular plane. The second reference line 470 obtained when the intersection 472 of the first reference line 468 and the second reference line 470 matches the apex 478 of the upper triangular plane is set to the Y axis (WY) of the coordinate system for the device 424 under measurement.

As described above, in the present embodiment, the detector of the coordinate measuring apparatus is used to obtain the position coordinates of two or more feature points located in measurement areas, and the position coordinates of at least one feature point that is not on a straight line connecting the measurement areas, in the same way as in the first to fourth embodiments. First and second reference lines are obtained according to the position coordinates of the feature points, and the position of the origin of a coordinate system for the device under measurement and the directions of the axes thereof are determined according to the reference lines. Therefore, in the present embodiment, a coordinate system for a triangular prism can be easily and accurately specified.

<Modifications>

In the present invention, even if the ratios of the lengths of the sides of the upper triangular face are not known, when second measurement areas include two or more feature portions, the position coordinates of third and fourth edge points in the feature portions are obtained, and the distance between each of the edge points and the first reference line 468 is obtained, then the angle θ formed between the side 480 and the side 482 of the upper triangular face can be obtained. Therefore, the position coordinates of the apex 478 of the upper triangular face can be obtained. As a result, the apex 478 of the upper triangular face can be set to the origin of the coordinate system for the device under measurement in the same way as in a case in which the ratios of the lengths of the sides of the upper triangular face are known.

Figure 6E:
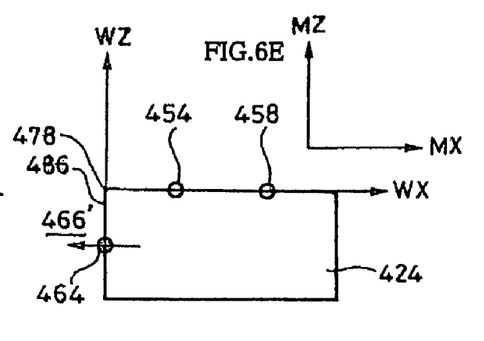

In the present invention, as shown in FIG. 6E, the second measurement area may be specified not on the upper end face of the triangular prism but on a side wall 468. In this case, a feature portion 466' is set not on the side 482 of the upper triangular face but on the side wall 486 of the triangular prism. The side wall 486 of the triangular prism is scanned in a direction indicated by an arrow in FIG. 6E along the X axis (MX) of the machine coordinate system to obtain the position of a third edge point 464'. A straight line passing through the third edge point 464' and perpendicular to the first reference line 468 is set as a second reference line. Even in this way, the present invention allows the apex 478 of the upper triangular face to be set as the origin (WO) of the coordinate system for the device under measurement, and the second reference line to be set as the Z axis (WZ) of the coordinate system for the device under measurement.

Sixth Embodiment

In each of the above-described embodiments, a coordinate system is specified for a device under measurement. The present invention can also be suitably applied to a case in which a device under measurement is disposed at a right angle to an axis of the machine coordinate system.

Conventionally, the user adjusts the position of a device under measurement until it forms a right angle with an axis of the machine coordinate system using his or her intuition. Such adjustment needs time and experience. Therefore, conventionally, there is room for improvement in the adjustment in terms of ease and accuracy.

In the present invention, by using a method for determining a coordinate system for a device under measurement according to the present embodiment, the device under measurement can be automatically placed at an angle to an axis of the machine coordinate system by a part program. The present invention allows a device under measurement to be placed at an angle to an axis of the machine coordinate system more easily and accurately than in the conventional method which is based on the intuition of the user.

Figure 7A:
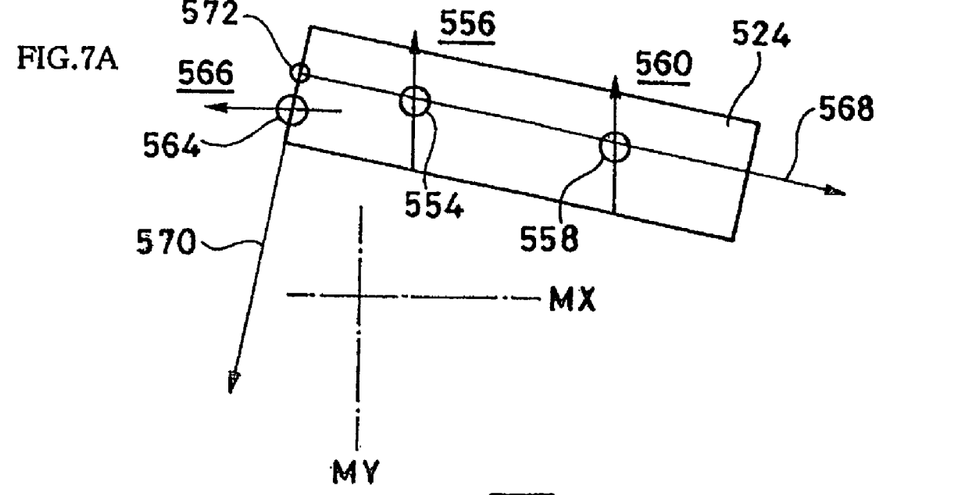
FIGS. 7A and 7B show a case in which a method for determining a coordinate system for a device under measurement according to the present invention is applied to a situation in which a cylinder is disposed at a right angle to an axis of a machine coordinate system. (a sixth embodiment of the present invention)
Figure 7B:
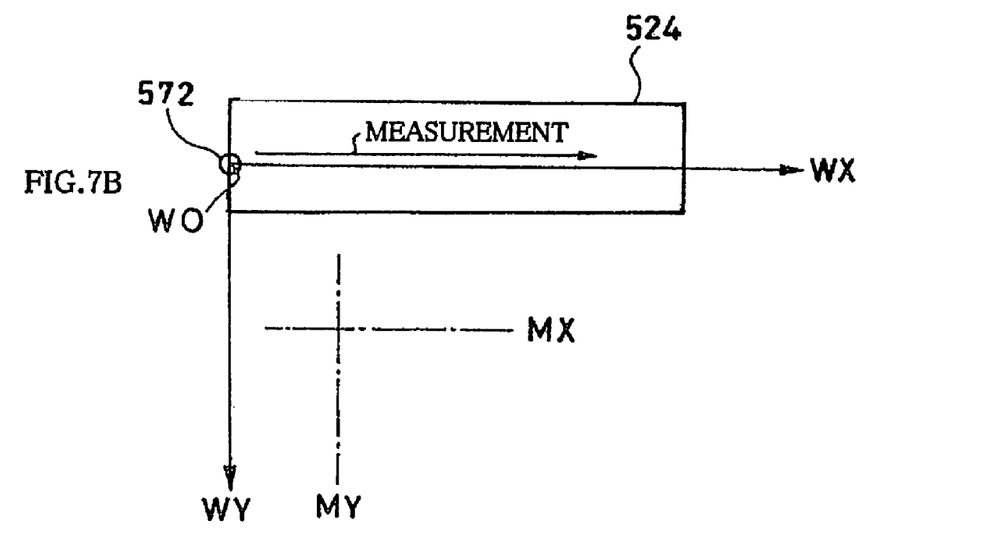

In the present embodiment, the position of a cylindrical device 524 under measurement placed horizontally on the XY plane of the machine coordinate system is adjusted such that the device under measurement is disposed at a right angle to an axis of the machine coordinate system. A description thereof will be described below by referring to FIG. 7.

Portions corresponding to those described in the first embodiment are assigned the same reference numerals, plus 500, as those used in the first embodiment, and a description thereof is omitted.

<Preliminary Measurement>

In a preliminary measurement step, as shown in FIG. 7A, two feature portions 556 and 560 on a circumferential wall section of the device 524 under measurement are scanned in the Y axis (MY) of the machine coordinate system. One feature portion 566 of the device 524 under measurement is scanned in the X axis (MX) of the machine coordinate system.

<Feature-Point Detection>

In a feature-point detection step, the position coordinates of a first peak 554 on the circumferential wall section that has the largest MZ coordinate in the machine coordinate system, the MZ axis being along the detection axis of the detector, are obtained from the measurement results of scanning performed in the MY direction of the machine coordinate system at the feature portion 556 on the circumferential wall section of the device 524 under measurement.

The position coordinates of a second peak 558 on the circumferential wall section that has the largest MZ coordinate in the machine coordinate system, the MZ axis being along the detection axis of the detector, are also obtained from the measurement results of scanning performed in the MY direction of the machine coordinate system at the feature portion 560 on the circumferential wall section of the device 524 under measurement.

The position coordinates of an edge point 564 are also obtained from the measurement results of scanning performed in the MX direction of the machine coordinate system at the feature portion 566 of the device 524 under measurement.

<Reference-Line Determination>

In a reference-line determination step, a straight line passing through the first peak 554 and the second peak 558 is used as a first straight line 568. The direction of the center axis of the device 524 under measurement can be obtained from the direction of the first reference line 568.

A straight line perpendicular to the first reference line 568 and passing through the edge point 564 is set to a second reference line 570. The direction of an end face of the device 524 under measurement can be obtained from the direction of the second reference line 570.

<Origin Setting>

In an origin setting step, the intersection 572 of the first reference line 568 and the second reference line 570 is obtained. The intersection 572 is set as the origin (WO) of the coordinate system for the device 524 under measurement.

<Axis Setting>

In an axis setting step, the first reference line 568 is set as the X axis (WX) of the coordinate system for the device 524 under measurement, as in the third embodiment. The second reference line 570 is set as the Y axis (WY) of the coordinate system.

<Axis Rotation>

In the present embodiment, the rotation angle (direction) of the device under measurement can be easily and accurately determined from the directions of the axes of the current coordinate system for the device under measurement obtained as described above.

As a result, when an instruction is given to the part program to rotate the X axis (WX) and the Y axis (WY) of the coordinate system for the device under measurement about the origin of the coordinate system by an angle corresponding to the rotation angle, the direction of the device 524 under measurement is automatically changed from that shown in FIG. 7A to that shown in FIG. 7B, where the device 524 under measurement is disposed at an angle to the MY (MX) axis. In the present embodiment, this operation is performed easily and accurately.

In the sixth embodiment, the coordinates described in the part program are changed by axis rotation. When the moving table 38 itself can be rotated in the MX-MY plane about the MZ axis, the coordinate system for the device under measurement can be disposed at a right angle to the MY (MX) axis by rotating the moving table 38. Alternatively, when a rotating table is placed on the moving table 38 and the device under measurement is placed on the rotating table, the coordinate system for the device under measurement can be disposed at a right angle to the MY (MX) axis by rotating the rotating table about the MZ axis. In both of these cases, the coordinates described in the part program do not need to be changed, and a computation error is prevented from occurring. In addition, the method for determining a coordinate system for a device under measurement according to the present invention may be repeated.

Modification

In each of the above embodiments, the surface-characteristic measuring apparatus is used as a coordinate measuring apparatus. However, other coordinate measuring apparatuses may be used.

In each of the above embodiments, needle-contact measurement is performed. However, a non-contact probe such as a laser probe used in an image measuring apparatus may be used. In this case, the device under measurement is not scratched by a needle.

In each of the above embodiments, two feature portions are measured, and a straight line connecting the two feature points is set as the first reference line. It may be possible in the present invention that three or more portions are measured and three or more feature points are used to obtain a first reference line by calculation using the method of least squares or the like.

In each of the above embodiments, the circumferential edge section is used as a feature portion of the device under measurement. However, a step section of the device under measurement may also be used. When the device under measurement has a recess, such as a groove, on the upper surface, the bottom of the recess may be used as a feature point. When the device under measurement has a protrusion on the upper surface, the peak of the protrusion may be used as a feature point.

When the moving table 38 has a tilt-adjustment structure, the moving table 38 may be adjusted to have the optimum angle according to a determined coordinate system for a device under measurement. Alternatively, when the detector 28 has a tilt-adjustment structure, the detector 28 may be adjusted to have the optimum angle according to a determined coordinate system for a device under measurement.

In each of the above-described embodiments, the moving table 38 is moved with respect to the detector 28 for scanning. The detector 28 may be moved with respect to the moving table 38 for scanning.

In the first embodiment, the X and Y axes are specified. In addition to these axes, a Z axis (WZ) perpendicular to the X and Y axes and passing through the origin may be specified.

In each of the above-described embodiments, an orthogonal coordinate system is specified. In the present invention, the coordinate system is not limited to an orthogonal coordinate system. A polar coordinate system may be specified. In the first embodiment, a polar coordinate system in which the origin WO is set to the center and the direction of the first reference line 68 is set to zero degrees may be used. Alternatively, a polar coordinate system in which the origin WO is set to the center and the direction of the second reference line 70 is set to zero degrees may be used.

In either polar coordinate system, a Z axis (WZ) may be additionally defined to specify a cylindrical coordinate system.

A plurality of coordinate systems each for the rotation or the tilt of a device under measurement and a detector may be set for the device under measurement.

When the orientation of a device under measurement or a detector is different between when a coordinate system for the device under measurement is determined and when an actual measurement is performed, it is possible to determine a coordinate system for the device under measurement for each orientation and the coordinate systems can be mutually converted.

As described above, a method for determining a coordinate system for a device under measurement according to the present invention includes a preliminary measurement step in which a detector of a coordinate measuring apparatus is used to measure two or more feature portions of the device under measurement and one or more feature portions that are not on a straight line connecting the two or more feature portions; a reference-line determination step of determining a reference line according to the position of each feature point in each measurement area; an origin-setting step of positioning the origin of the coordinate system for the device under measurement according to the reference line; and an axis setting step of determining the directions of axes according to the reference line. As a result, the coordinate system can be both easily and accurately determined for the device under measurement in the present invention.

A coordinate measuring apparatus according to the present invention includes preliminary measurement unit for measuring two or more feature portions of the device under measurement and one or more feature portions that are not on a straight line connecting the two or more feature portions, by the use of a detector of the coordinate measuring machine; reference-line determination unit for determining a reference line according to the position of each feature point in each measurement area; origin-setting unit for positioning the origin of the coordinate system for the device under measurement according to the reference line; and axis setting unit for determining the directions of axes according to the reference line. As a result, the coordinate system can be both easily and accurately determined for the device under measurement in the present invention.

What is claimed is:

1. A method for determining a coordinate system for a device under measurement, in which the direction and position of the coordinate system are determined for the device under measurement according to the position of a feature point obtained by measuring a feature portion of the device under measurement, the relationships of axes in the coordinate system selected in advance being known, the method comprising:

a preliminary measurement step in which a detector of a coordinate measuring apparatus is used to scan first measurement areas which include two or more feature portions of the device under measurement to obtain position coordinate information and the detector of the coordinate measuring apparatus is used to scan a second measurement area which includes one or more feature portions that are not on a straight line connecting the first measurement areas to obtain position coordinate information;

a feature-point detection step of obtaining the position of a feature point in each of the measurement areas according to a result of measurement obtained in the preliminary measurement step;

a reference-line determination step of obtaining a first reference line according to the position of each feature point in the first measurement areas obtained in the feature-point detection step, and of obtaining a second reference line perpendicular to the first reference line and passing through a feature point located in the second measurement area, obtained in the feature-point detection step;

an origin-setting step of positioning the origin of the coordinate system for the device under measurement according to the position of the intersection of the first reference line and the second reference line obtained in the reference-line determination step; and an axis setting step of determining the directions of axes of the coordinate system for the device under measurement according to the directions of the reference lines obtained in the reference-line determination step.

2. A method for determining a coordinate system for a device under measurement, according to claim 1, wherein, when the device under measurement is substantially a quadrangular prism, or the device under measurement includes a substantially quadrangular-prism-shaped portion, and when the direction and position of the coordinate system are determined for the device under measurement, in the preliminary measurement step, the first measurement areas are scanned to traverse one side of the device under measurement at a certain spatial interval, and the second measurement area is scanned to traverse another side adjacent to the one side;

in the feature-point detection step, the position of an edge point is obtained at each of the measurement areas according to a result of measurement obtained in the preliminary measurement step;

in the reference-line determination step, the first reference line is obtained according to the position of each edge point in the first measurement areas, obtained in the feature-point detection step, and the second reference line perpendicular to the first reference line and passing through an edge point located in the second measurement area, obtained in the feature-point detection step, is obtained;

in the origin-setting step, the position of the intersection of the first reference line and the second reference line obtained in the reference-line determination step is set as the origin of the coordinate system for the device under measurement; and in the axis setting step, the reference lines obtained in the reference-line determination step are set as axes of the coordinate system for the device under measurement.

3. A method for determining a coordinate system for a device under measurement, according to claim 1, wherein, when the device under measurement is substantially a cylinder, or the device under measurement includes a substantially cylinder-shaped portion, and when the direction and position of the coordinate system are determined for the device under measurement, in the preliminary measurement step, the first measurement areas are scanned on a circumferential wall section of the device under measurement at a certain spatial interval along an axis direction, and the second measurement area is scanned to traverse a circumferential edge section of the device under measurement;

in the feature-point detection step, the position of each peak along a detection axis in the first measurement areas is obtained, and the position of an edge point in the second measurement area is obtained;

in the reference-line determination step, the first reference line is obtained according to the position of each edge point in the first measurement areas, obtained in the feature-point detection step, and the second reference line perpendicular to the first reference line and passing through an edge point located in the second measurement area, obtained in the feature-point detection step, is obtained;

in the origin-setting step, the position of the circumferential edge section of the device under measurement is obtained according to the position of the intersection of the first reference line and the second reference line obtained in the reference-line determination step, and the origin of the coordinate system for the device under measurement is positioned according to the position of the circumferential edge section; and in the axis setting step, the directions of axes of the coordinate system for the device under measurement are determined according to the directions of the reference lines obtained in the reference-line determination step.

4. A coordinate measuring apparatus for moving an axis and for performing measurement according to a part program, comprising a unit for determining a coordinate system for a device under measurement, in which the direction and position of the coordinate system are determined for the device under measurement according to the position of a feature point obtained by measuring a feature portion of the device under measurement, the relationships of axes in the coordinate system selected in advance being known, the unit for determining the coordinate system for the device under measurement comprising:

a preliminary measurement unit for scanning first measurement areas which include two or more feature portions of the device under measurement with the use of a detector of the coordinate measuring apparatus to obtain position coordinate information and for scanning a second measurement area which includes one or more feature portions that are not on a straight line connecting the first measurement areas, with the use of the detector of the coordinate measuring apparatus, to obtain position coordinate information;

a feature-point detector for obtaining the position of a feature point in each of the measurement areas according to a result of measurement obtained by the preliminary measurement unit;

a reference-line determination unit for obtaining a first reference line according to the position of each feature point in the first measurement areas, obtained by the feature-point detector, and for obtaining a second reference line perpendicular to the first reference line and passing through a feature point located in the second measurement area, obtained by the feature-point detector;

an origin-setting unit for positioning the origin of the coordinate system for the device under measurement according to the position of the intersection of the first reference line and the second reference line obtained by the reference-line determination unit; and an axis setting unit for determining the directions of axes of the coordinate system for the device under measurement according to the directions of the reference lines obtained by the reference-line determination unit.

* * * * *